Patented July 31, 1951

2,562,855

UNITED STATES PATENT OFFICE 2,562,855

ESTERS OF 2,4,5-TRICHLOROPHENOXY-ACETIC ACID

Edgar C. Britton and Louis E. Begin, Midland, Mich., assignors to The Dow Chemical Company, Midland, Mich., a corporation of Delaware No Drawing. Application May 22, 1950, Serial No. 163,566

7 Claims. (Cl. 260—473)

1

The present invention relates to esters of 2,4,5-trichlorophenoxyacetic acid and is particularly concerned with compounds having the formula

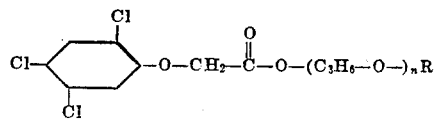

wherein $n$ is an integer not greater than 2, and R represents an alkyl radical containing from 1 to 9 carbon atoms, inclusive. These compounds are adapted to be employed as modifiers in plastic compositions; preservatives for paper, wood, and cellulosic textiles; and plant growth control materials.

The new esters are oily liquids, somewhat soluble in many organic solvents, and substantially insoluble in water. These compounds are stable to light and air, not appreciably affected by carbon dioxide, noncorrosive to the skin of man and higher animals, and of low volatility.

The compounds may be prepared by reacting a molecular proportion of (1) 2,4,5-trichlorophenoxyacetic acid with (2) at least a molecular proportion of an alkyl mono-ether of mono- or dipropylene glycol such as methoxy-propanol, ethoxy - propanol, propoxy - propanol, butoxy-propanol, hexoxy-propanol, nonyloxy-propanol, methoxy - propoxy - propanol, ethoxy - propoxy-propanol, propoxy - propoxy-propanol, butoxy-propoxy-propanol, hexoxy-propoxy-propanol, and nonyloxy-propoxy-propanol. Good yields are obtained when a small excess of the ether-alcohol is employed, and the water of reaction is removed as formed. The reaction is carried out in the presence of a dehydration catalyst, such as sulfuric acid, phenol sulfonic acid or a cation exchange resin in the acid form.

In a preferred method of operation, 2,4,5-trichlorophenoxyacetic acid, a small molecular excess of the propylene glycol alkyl mono-ether, and the catalyst are mixed together and heated for a period of time at a temperature of from 90° to 160° C. The heating is carried out under reduced pressure to remove water of reaction together with some of the excess of the ether alcohol. When the reaction has approached completion, ethylene dichloride, carbon tetrachloride or other water-immiscible solvent may be added to the mixture and the catalyst and any unreacted 2,4,5-trichlorophenoxyacetic acid neutralized with an alkali such as dilute aqueous sodium carbonate or ammonium bicarbonate. The resulting mixture divides into aqueous and solvent layers. The solvent layer, which contains the ester reaction product, is separated and washed several times with water. The solvent is then removed by distillation under reduced pressure to obtain the desired ester compound.

In an alternative procedure, the reaction is carried out in a water-immiscible solvent, such as ethylene dichloride. The reactants and catalyst are dispersed in the solvent and heated together for a period of time at a temperature of from 90° to 150° C. A mixture of the solvent and water of reaction is continuously distilled out of the reaction vessel, condensed, and the solvent recovered. Additional solvent is introduced into the reaction zone as may be necessary. Upon completion of the reaction the mixture may be neutralized, as with dilute aqueous sodium carbonate, and the solvent layer separated from the aqueous layer and washed several times with water. The solvent is then removed by distillation under reduced pressure to obtain the ester product.

The mono- and dipropylene glycol alkyl mono-ethers employed as starting materials may be obtained by the reaction of propylene oxide with an excess of a monohydric aliphatic alcohol. The reaction is carried out in the presence of a catalyst such as sulfuric acid or sodium hydroxide. In one method of preparing the ether-alcohols the reactants are mixed and heated together in the presence of the catalyst for ½ hour at a temperature of 170° C. and a pressure of 200 pounds per square inch. The mixed reaction product may then be employed as the mono-ether starting material or the individual ether-alcohols separated by subjecting the mixed reaction product to fractional distillation under reduced pressure.

The following examples illustrate the invention but are not to be construed as limiting the same:

*Example 1.*—*2-methoxy-1-propyl ester of 2,4,5-trichlorophenoxyacetic acid*

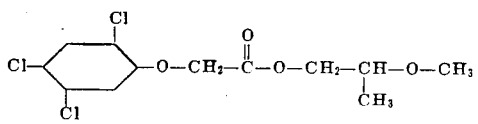

255.5 grams (1 mole) of 2,4,5-trichlorophenoxyacetic acid, 90 grams (1 mole) of 2-methoxy-1-propanol (boiling at 130° C. at 750 millimeters pressure), 200 milliliters of ethylene dichloride, and 1 milliliter of concentrated sulfuric acid were mixed together and the resulting dispersion heated for 1½ hours at a pot temperature of from 91° to 112° C. The operation was carried out with continuous distillation of ethylene dichloride together with the water of reaction as formed, separation of the water, and recycling of the ethylene dichloride. Upon completion of the reaction, the ethylene dichloride was removed by distillation at reduced pressures, to obtain the 2-methoxy-1-propyl ester of 2,4,5-trichlorophenoxyacetic acid. This product was an oily liquid having a refractive index n/D of 1.536 at 25° C. and a chlorine content of 32.6 per cent. The theoretical chlorine content for $C_{12}H_{13}O_4Cl_3$ is 32.2 per cent.

*Example 2.—1-isopropoxy-2-propyl ester of 2,4,5-trichlorophenoxyacetic acid*

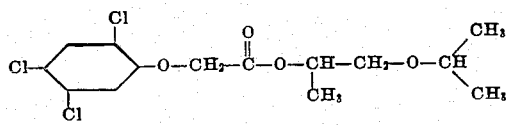

372 grams (3.15 moles) of 1-isopropoxy-2-propanol (boiling at 139° C. at 760 millimeters pressure), 765 grams (3 moles) of 2,4,5-trichlorophenoxacetic acid, 200 milliliters of ethylene dichloride, and 3 milliliters of sulfuric acid were heated together for 4½ hours at a pot temperature of from 101° to 132° C. The operation was carried out with continuous distillation of ethylene dichloride together with the water of reaction as formed, separation of the water, and recycling of the ethylene dichloride. Upon completion of the reaction, the ethylene dichloride was removed by distillation at reduced pressure, to obtain the 1-isopropoxy-2-propyl ester of 2,4,5-trichlorophenoxyacetic acid as an oily liquid having a refractive index n/D of 1.52 at 25° C. and a chlorine content of 29.29 per cent. The theoretical chlorine content for $C_{14}H_{17}O_4Cl_3$ is 29.6 per cent.

*Example 3.—1-nonyloxy-2-propyl ester of 2,4,5-trichlorophenoxyacetic acid*

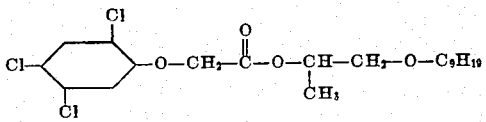

206 grams (.808 mole) of 2,4,5-trichlorophenoxyacetic acid, 162.5 grams (.808 mole) of 1-nonyloxy-2-propanol (boiling at 88° to 95° C. at 3 millimeters pressure, and having a refractive index n/D of 1.4350 at 25° C.), and 1 milliliter of concentrated sulfuric acid were heated together for 15 minutes at a pot temperature of from 105° to 120° C. The reaction mixture was then placed under reduced pressure and the temperature gradually increased to distill a mixture of water and 1-nonyloxy-2-propanol out of the reaction zone, until the pot temperature reached 150° C. The crude reaction mixture was then cooled to room temperature, diluted with 300 milliliters of carbon tetrachloride, and the resulting mixture filtered. The filtrate was washed with dilute aqueous sodium carbonate, filtered, and successively washed with dilute aqueous sodium carbonate and water. The carbon tetrachloride was then removed by distillation to a pot temperature of 170° C. at 1 millimeter pressure to obtain the 1-nonyloxy-2-propyl ester of 2,4,5-trichlorophenoxyacetic acid. The latter was an oily liquid having a refractive index of 1.511 at 25° C. and a chlorine content of 24.77 per cent as compared with a theoretical chlorine content of 24.0 per cent.

*Example 4.—Butoxy-propoxy-propyl ester of 2,4,5-trichlorophenoxyacetic acid*

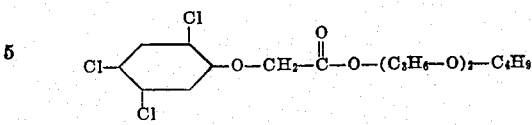

5110 grams (20 moles) of 2,4,5-trichlorophenoxyacetic acid, 3800 grams (20 moles) of butoxy-propoxy-propanol (boiling at 228° C. at 760 millimeters pressure), 1820 milliliters of ethylene dichloride, and 15 milliliters of concentrated sulfuric acid were heated together by the method of Example 1 for 16 hours at a pot temperature of from 80° to 127° C. to obtain the butoxy-propoxy-propyl ester of 2,4,5-trichlorophenoxyacetic acid. This product was an oily liquid having a refractive index n/D of 1.5072 at 25° C. and a chlorine content of 24.2 per cent as compared to a theoretical chlorine content of 24.7 per cent.

*Example 5*

486 grams (3.17 moles) of a mixed polypropylene glycol butyl ether (having an average molecular weight of 153 and containing 72 per cent of 1-butoxy-2-propanol, 20 per cent of butoxy-propoxy-propanol, and 8 per cent of the butyl ethers of tri- and higher polypropylene glycols), 766.5 grams (3 moles) of 2,4,5-trichlorophenoxyacetic acid, and 15 grams of phenol sulfonic acid were heated for 5½ hours at a pot temperature of from 121° to 179° C. The reaction mixture was then placed under reduced pressure and the temperature gradually increased to distill a mixture of water and propylene glycol butyl ethers out of the raction zone, until the pot temperature reached 149° C. The crude reaction mixture was then filtered and the filtrate diluted with dilute aqueous ammonium bicarbonate and a small amount of carbon tetrachloride. The resulting mixture was again filtered and the filtrate washed with dilute aqueous sodium carbonate. Carbon tetrachloride was removed from the mixture by distillation to a pot temperature of 130° C. at 35 to 45 millimeters pressure to obtain the mixed ester product consisting essentially of the 1-butoxy-2-propyl and butoxy-propoxy-propyl esters of 2,4,5-trichlorophenoxyacetic acid. This product was an oily liquid having a refractive index n/D of 1.5132 at 25° C. and a specific gravity of 1.2184 at 25° C.

*Example 6*

261 pounds (657 moles) of a mixed polypropylene glycol methyl ether (having an average molecular weight of 180 and containing 60 per cent of methoxy-propoxy-propanol, 26 per cent of methoxy-propoxy-propoxy-propanol, and 14 per cent of the methyl ethers of tetra- and higher polypropylene glycols), 336 pounds (598 moles) of 2,4,5-trichlorophenoxyacetic acid, and 30 pounds of a cation exchange resin in the acid form (styrene-divinylbenzene copolymer, sulfonated) were heated together for 69 hours at a pot temperature of 130° C. at 5 to 6 inches pressure. The reaction mixture was then filtered to separate the mixed ester product consisting essentially of the methoxy-propoxy-propyl and methoxy-propoxy-propoxy-propyl esters of 2,4,5-trichlorophenoxyacetic acid. This product was an oily liquid having a refractive index n/D of 1.5101 at 25° C. and a chlorine content of 25.93.

We claim:
1. The esters of 2,4,5-trichlorophenoxyacetic acid having the formula

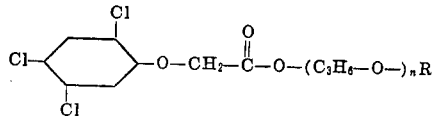

wherein $n$ is an integer not greater than 2, and R represents an alkyl radical containing from 1 to 9 carbon atoms.

2. The esters of 2,4,5-trichlorophenoxyacetic acid having the formula

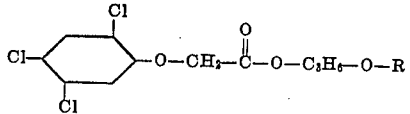

wherein R represents an alkyl radical containing from 1 to 9 carbon atoms.

3. The esters of 2,4,5-trichlorophenoxyacetic acid having the formula

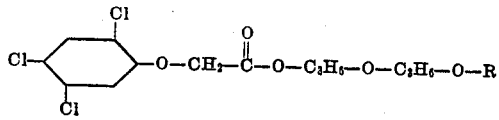

wherein R represents an alkyl radical containing from 1 to 9 carbon atoms, inclusive.

4. The butoxy-propoxy-propyl ester of 2,4,5-trichlorophenoxyacetic acid.

5. The propoxy-propoxy-propyl ester of 2,4,5-trichlorophenoxyacetic acid.

6. The butoxy-propyl ester of 2,4,5-trichlorophenoxyacetic acid.

7. The propoxy-propyl ester of 2,4,5-trichlorophenoxyacetic acid.

EDGAR C. BRITTON.
LOUIS E. BEGIN.

REFERENCES CITED

The following references are of record in the file of this patent:

UNITED STATES PATENTS

| Number | Name | Date |
|---|---|---|
| 2,396,513 | Jones | Mar. 12, 1946 |
| 2,523,189 | Britton et al. | Sept. 19, 1950 |